US006313249B1

US006313249B1

(12) United States Patent
Nakanishi et al.

(10) Patent No.: US 6,313,249 B1
(45) Date of Patent: Nov. 6, 2001

(54) ORGANOPOLYSILOXANE-GRAFTED COPOLYMERIC COMPOUND

(75) Inventors: Tetsuo Nakanishi; Ichiro Ono, both of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/538,262

(22) Filed: Mar. 30, 2000

(30) Foreign Application Priority Data

Mar. 31, 1999 (JP) .................................................. 11-092205

(51) Int. Cl.$^7$ ....................................................... C08F 30/08
(52) U.S. Cl. ...................... 526/279; 526/329.7; 526/318; 526/44; 526/319; 526/328; 525/479
(58) Field of Search ................................. 526/279, 329.7, 526/318.44, 319, 328; 525/479

(56) References Cited

U.S. PATENT DOCUMENTS 6,030,255 * 2/2000 Konishi et al. .

FOREIGN PATENT DOCUMENTS

58154766-A * 9/1983 (JP) .

* cited by examiner

*Primary Examiner*—Robert Dawson
*Assistant Examiner*—Kuo-Liang Peng
(74) *Attorney, Agent, or Firm*—Millen, White, Zelano & Branigan, P.C.

(57) ABSTRACT

Disclosed is a method for the preparation of an organopolysiloxane-grafted graft copolymer of a carbon-carbon backbone chain structure which is free from the troubles due to emission of an irritative odour and instability in storage. The method comprises the steps of copolymerizing a (meth)acryloxyalkyl-terminated organopolysiloxane compound with (meth)acrylic acid or an alkyl (meth)acrylate, optionally, together with a long chain-alkyl (meth)acrylate and/or a (meth)acryloxy-terminated polyoxyalkylene compound in a solution polymerization process to give a polymer solution and subjecting the polymer solution to a catalytic hydrogenation treatment so as to completely eliminate any unpolymerized acrylic compounds.

16 Claims, No Drawings

ORGANOPOLYSILOXANE-GRAFTED COPOLYMERIC COMPOUND

BACKGROUND OF THE INVENTION

The present invention relates to a graft copolymer having a molecular structure consisting of a carbon-carbon backbone chain structure and grafting units thereon derived from an organopolysiloxane. More particularly, the invention relates to an organopolysiloxane-grafted organic polymer free from aliphatic unsaturation and safe from the troubles due to emission of an offensive or irritative odour and low storage stability as well as to an improved method for the preparation of such an organopolysiloxane residue-grafted copolymer.

Graft copolymers consisting of a backbone moiety of an organopolysiloxane and grafting moiety derived from an organic polymer are well known in the prior art. For example, the hydrosilation reaction between an organopolysiloxane having silicon-bonded hydrogen atoms and an alkenyl-terminated polyoxyalkylene compound in the presence of a platinum catalyst leads to a graft copolymer of which the backbone moiety is derived from the organopolysiloxane molecules and the grafting moiety consists of the polyoxyalkylene residues. Such a graft copolymer is usually referred to as a polyoxyalkylene-modified or polyether-modified organopolysiloxane.

A serious problem in such polyoxyalkylene-modified organopolysiloxanes in general is that, since the hydrosilation reaction cannot proceed to completeness, the reaction product more or less contains a small amount of the unreacted alkenyl-containing polyoxyalkylene compound or an impurity by-product compound formed by the intramolecular rearrangement reaction thereof which is responsible for the emission of an offensive odour. The polyoxyalkylene molecules per se are susceptible to an oxidative degradation reaction to produce an aldehyde compound which is also very offensively odorous.

With an object to solve this problem due to emission of an offensive odour from a polyoxyalkylene-modified organopolysiloxane, a proposal is made in U.S. Pat. No. 5,225,509 and Japanese Patent Kokai 7-330907 according to which the reaction mixture after the hydrosilation reaction is subjected to a hydrogenation reaction to effect deodorization by the hydrogenating reduction of the alkenyl groups and prevention of oxidative degradation of the polyoxyalkylene groups.

Apart from the above described polyoxyalkylene-modified or ganopolysiloxanes as a graft copolymer, organopolysiloxane-grafted organic polymer-based graft copolymers are also disclosed in Japanese Patent Kokai 58-154766, 59-20360, 59-126478, 61-151972 and 62-156172 and elsewhere. As compared with the above described polyoxyalkylene-modified organopolysiloxanes, the organopolysiloxane-grafted copolymers have excellent weatherability, water-repellency, anti-stain insusceptibility, surface releasability, lubricity and other properties so that proposals are made for the application of these graft copolymers as an adjuvant in a variety of coating compositions. In particular, proposals are made in recent years in Japanese Patent Kokai 5-339125, 6-9332, 6-279232, 7-187951, 7-137954, 7-196449, 8-143427 and 9-296134 and elsewhere for the use of the organopolysiloxane-grafted copolymer as an additive ingredient in cosmetic and toiletry preparations.

The most typical method for the preparation of an organopolysiloxane-grafted organic graft copolymer is a radical copolymerization reaction of a macromolecular organopolysiloxane compound having a radical-polymerizable terminal group at a single molecular chain end as a grafting unit-containing comonomer with an organic radical-polymerizable monomeric compound or compounds to form the carbon-carbon backbone chain structure of the graft copolymer so as to introduce the organopolysiloxane residues as the grafting units onto the backbone chain structure. Since the copolymerization reaction is conducted in most cases with a (meth)acrylic group-containing monomeric compound as the organic comonomer for the backbone structure and a (meth)acryloxyalkyl group-terminated organopolysiloxane as the grafting unit-introducing comonomer, it is sometimes the case that a strongly irritative odour is emitted from the graft copolymer obtained by the copolymerization reaction. The irritative odour in this case is much more offensive than the aldehydic odour emitted from the polyoxyalkylene-modified organopolysiloxanes. When the organopolysiloxane-grafted copolymer contains a substantial amount of unreacted (meth)acrylic monomers, moreover, the graft copolymer product cannot be fully stable in storage and cannot be free from the problem of safety due to the high radical-reactivity of the (meth)acrylic groups so that application fields of the graft copolymers for commercial products are necessarily limited despite the so large possibility of applications and the great demand from the commercial market for the graft copolymer products.

SUMMARY OF THE INVENTION

The present invention accordingly has an object, in view of the above described problems and disadvantages in the graft copolymers between an organopolysiloxane and an organic polymer or, in particular, in organopolysiloxane-grafted organic graft copolymers, to provide a novel and improved organopolysiloxane-grafted copolymer almost free from emission of any offensive odours and also free from the problems relative to the stability in storage and safety in a wide field of applications. Another object of the invention is to provide an efficient method for the preparation of the above mentioned improved organopolysiloxane-grafted copolymer.

Thus, the graft copolymer provided by the present invention consists of:

(A) a backbone moiety of an organic polymeric structure formed of a carbon-carbon backbone chain; and (B) a grafting moiety comprising a plurality of (B1) organopolysiloxane residues as the grafting units each bonded to the carbon atom in the carbon-carbon backbone chain, the graft copolymer being free from aliphatic unsaturation.

Though optional, the above mentioned grafting moiety may further comprise (B2) long-chain alkyl groups and/or (B3) polyoxyalkylene residues as additional grafting units.

The above defined novel organopolysiloxane-grafted organic copolymer can be prepared by a process which comprises the steps of:

(1) dissolving, in an organic solvent, a radical-polymerizable ethylenically unsaturated organic monomeric compound, an organopolysiloxane terminated at a single molecular chain end of the molecule with a radical-polymerizable group and a radical-polymerization initiator to form a polymerization mixture;

(2) heating the polymerization mixture at an elevated temperature to form a copolymer solution by the copolymerization reaction of the organic monomeric compound and the organopolysiloxane having a radical-polymerizable terminal group in the presence of the radical-polymerization initiator;

(3) subjecting the copolymer solution to a hydrogenation reaction under pressurization with hydrogen gas in the presence of a hydrogenation catalyst; and (4) removing the hydrogenation catalyst from the copolymer solution to give an organopolysiloxane-grafted copolymer free from aliphatic unsaturation.

When the grafting moiety in the organopolysioxane-grafted copolymer comprises, in addition to the organopolysiloxane residues, long-chain alkyl groups and/or polyoxyalkylene-residues as the grafting units, the polymerization mixture prepared in step (1) of the above described preparation method further contains a long-chain alkyl group-containing radical-polymerizable monomeric compound and/or a polyoxyalkylene compound terminated at a single molecular chain end with a radical-polymerizable group.

DETAILED DESCRIPTION OF THE PREFERRED EMBODIMENTS

As is described above, the organopolysiloxane-grafted copolymer of the present invention consists of (A) the backbone moiety formed from carbon-carbon molecular chains and (B) the grafting moiety comprising (B1) organopolysiloxane residues, optionally, in combination with (B2) long-chain alkyl groups and/or (B3) polyoxyalkylene residues as the grafting units.

In the above described preparation method of the graft copolymer, the backbone moiety (A) formed from a carbon-carbon polymeric chain structure is derived in the copolymerization reaction from a radical-polymerizable ethylenically unsaturated organic monomeric compound, referred to as the comonomer (a) hereinafter.

A great variety of organic monomeric compounds can be used as the comonomer (a), of which those belonging to the most preferable class include (meth)acrylic acid, which means acrylic and methacrylic acids inclusively, as well as derivatives thereof such as alkyl and hydroxyalkyl esters thereof, in which the alkyl or hydroxyalkyl group has 1 to 4 carbon atoms, exemplified by methyl (meth)acrylate, ethyl (meth)acrylate, propyl (meth)acrylate, butyl (meth)acrylate, 2-hydroxyethyl (meth)acrylate, 3-hydroxypropyl (meth)acrylate and 4 hydroxybutyl (meth)acrylate.

Other classes of organic monomeric compounds suitable as the comonomer (a) include amide compounds such as (meth)acrylamide, amino-derivatives of (meth)acrylic acid such as 2-(dimethylamino)ethyl (meth)acrylate, acid-neutralized compounds of these amide and amino compounds, aminoacetic acid betaine derivatives as a reaction product of an amino compound and sodium monochloroacetate, sulfobetaine compounds as a sulfonic acid salt of an amino compound and epoxy group-containing esters of (meth)acrylic acid such as glycidyl (meth)acrylate and 3,4-epoxycyclohexylmethyl (meth)acrylate.

Further classes of radical-polymerizable monomeric compounds usable as the comonomer (a) include styrene and styrene derivatives, unsaturated carboxylic acids such as fumaric acid, itaconic acid, maleic acid and crotonic acid as well as sodium, potassium and ammonium salts thereof, radical-polymerizable organosilane compounds such as vinyl triethoxy silane and 3-(methacryloxy)propyl trimethoxy silane, (meth)acrylonitrile, vinyl pyrrolidone, vinyl alkyl ethers, and polystyrenes and polycaprolactones having at least one radical-polymerizable group in a molecule.

The above named various monomeric compounds can be used either singly or as a combination of two kinds or more according to need as the comonomer (a).

Though not particularly limitative, it is preferable that the radical-polymerizable ethylenically unsaturated group, which can be a (meth)acryloxy group or an alkenyl group such as vinyl and allyl groups, terminating at a single molecular chain end of the organopolysiloxane compound, referred to as the comonomer (b1) hereinafter, to be copolymerized with the above described organic comonomer (a) to introduce the organopolysiloxane residues (B1) into the graft copolymer as the grafting units, is a (meth)acryloxyalkyl group so that the comonomer (b1) is represented by the general formula $$CH_2=CR^1-CO-O-R^2-SiR_m[-(-O-SiR_2-)_n-O-SiR_3]_{3-m}, \quad (I)$$

in which R is, each independently from the others, an unsubstituted or halogen-substituted monovalent hydrocarbon group having 1 to 18 carbon atoms and, preferably, free from aliphatic unsaturation, $R^1$ is a hydrogen atom or a methyl group, $R^2$ is a divalent hydrocarbon group having 1 to 11 carbon atoms or, preferably, an alkylene group, the subscript m is 0, 1 or 2 and the subscript n is 0 or a positive number not exceeding 200 on an average.

The above defined (meth)acryloxyalkyl-terminated diorganopolysiloxane as the comonomer (b1) is referred to as the $G^1$-monomer hereinafter.

Particularly preferable examples of the diorganosiloxane unit of the formula $-(-O-SiR_2-)-$ forming the $G^1$-monomer of the general formula (I) above include dimethylsiloxane unit, dialkylsiloxane units of which the alkyl groups each have 2 to 18 carbon atoms, methylphenylsiloxane unit, diphenylsiloxane unit, methyl (3,3,3-trifluoropropyl) siloxane unit and the like, of which dimethylsiloxane unit is more preferable.

The (meth)acryloxyalkyl-terminated diorganopolysiloxane compound as the $G^1$-monomer can be synthesized in the following manner known in the prior art. Thus, a (meth)acryloxyalkyl chlorosilane compound of the general formula $$CH_2=CR^1-CO-O-R^2-SiR_mCl_{3-m},$$

In which each symbol has the same meaning as defined above, is subjected to a dehydrochlorination reaction or a desalting reaction with a terminal-functional diorganopolysiloxane of the general formula $$X-(-O-SiR_2-)_n-O-SiR_3,$$

in which R and n each have the same meaning as defined above and X is a hydrogen atom or a lithium atom, respectively, according to a known procedure.

When the above described $G^1$-monomer alone is subjected to a homopolymerization reaction in the presence of a radical-polymerization initiator, the resultant polymer is also a graft copolymer consisting wholly of repetition of the monomeric units of the formula $$-(-CH_2-CHG^1-)-, \quad (Ia)$$

in which $G^1$ is an organopolysiloxane residue bonded as a grafting unit to the carbon-carbon backbone chain structure, as derived from the $G^1$-monomer and represented by the formula $$-CO-O-R^2SiRm[-(-O-SiR_2-)_n-O-SiR_3]_{3-m}, \quad (Ib)$$

in which each symbol has the same meaning as defined above.

In the above described graft copolymer obtained by the homopolymerization of the $G^1$-monomer of the general formula (I) alone, the number of the grafting units $G^1$ in a molecule is naturally equal to the degree of polymerization of the polymer.

In order to control the content of the organopolysiloxane residues as the grafting units in the graft copolymer, the (meth)acryloxyalkyl-terminated diorganopolysiloxane of the general formula (I) is copolymerized with the comonomer (a), i.e. a radical-polymerizable ethylenically unsaturated monomeric compound which is preferably (meth)acrylic acid or an alkyl (meth)acrylate represented by the general formula $$CH_2=CR^1-CO-O-R^3, \qquad (II)$$

In which $R^1$ has the same meaning as defined above and $R^3$ is a hydrogen atom or an alkyl group having 1 to 4 carbon atoms, optionally, substituted by a hydroxyl group. The graft copolymer obtained by the copolymerization of the $G^1$-monomer of the general formula (I) and the (meth)acrylic monomer of the general formula (II) consists of two types of repeating monomeric units including those of the formula (Ia) and those expressed by the formula $$-[-CH_2-CR^1(-CO-O-R^3)-]-, \qquad (IIa)$$

in which each symbol has the same meaning as defined above.

The copolymerization ratio of the first and second comonomers represented by the general formulas (I) and (II), respectively, or, namely, the molar mixing ratio of the two comonomers in the polymerization mixture should be selected naturally depending on the desired molar ratio of the two types of the repeating monomeric units in the graft copolymer or the desired content of the organopolysiloxane residues as the grafting units in the graft copolymer.

Particular examples of the (meth)acrylic monomer compound to be copolymerized with the (meth)acryloxyalkyl-terminated organopolysiloxane include (meth)acrylic acid, methyl (meth)acrylate, ethyl (meth)acrylate, propyl (meth)acrylate, butyl (meth)acrylate, hydroxymethyl (meth)acrylate, 2-hydroxyethyl (meth)acrylate, 3-hydroxypropyl (meth)acrylate and 4-hydroxybutyl (meth)acrylate, though not particularly limitative thereto.

Although it is advantageous that the carbon-carbon backbone chain structure of the graft copolymer is formed from the above described acrylic monomer compounds, a variety of radical-polymerizable ethylenically unsaturated monomeric compounds can be used as the comonomer (a) in place of or in combination with the above described acrylic monomeric compound. Examples of the monomeric compounds usable as the comonomer (a) include acid amide compounds such as (meth)acrylamide, amino-substituted (meth)acrylic compounds such as 2-(dimethylamino)ethyl (meth)acrylate, epoxy-containing (meth)acrylic compounds such as glycidyl (meth)acrylate, 3,4-epoxycyclohexylmethyl (meth)acrylate, styrene and derivatives thereof, unsaturated dicarboxylic acids such as fumaric acid, itaconic acid, maleic acid and crotonic acid as well as salts thereof, radical-poymerizable organosilane compounds such as vinyl triethoxy silane and 3-(meth)acryloxypropyl triethoxy silane, (meth)acrylonitrile, vinyl pyrrolidone, vinyl carboxylates such as vinyl acetate and vinyl propionate, vinyl alkyl ethers and radical-polymerizable macromers such as polystyrenes and polycaprolactones having at least one radical-polymerizable group in a molecule.

These monomeric compounds as well as the (meth)acrylic monomers of the general formula (II) can be used either singly or as a combination of two kinds or more according to need as the comonomer (a) in the copolymerization reaction to form the graft copolymer.

When introduction of long-chain alkyl groups into the graft copolymer as the grafting units on the carbon-carbon backbone chain structure is desired, the copolymerization reaction of the (meth)acryloxyalkyl-terminated diorganopolysiloxane compound of the general formula (I), optionally, in combination with the (meth)acrylic monomer of the general formula (II) is conducted with a polymerization mixture further containing a long-chain alkyl (meth)acrylate, referred to as the $G^2$-monomer hereinafter, represented by the general formula $$CH_2=CR^1-CO-O-R^4, \qquad (III)$$

In which $R^1$ has the same meaning as defined above and $R^4$ is a linear or branched alkyl group have 5 to 50 or, preferably, from 8 to 30 carbon atoms. Examples of the alkyl group denoted by $R^4$ include lauryl, cetyl, palmityl, stearyl and behenyl groups. Examples of particularly preferable long-chain alkyl-containing (meth)acrylate monomers include stearyl (meth)acrylate and behenyl (meth)acrylate. Several commercial products of these long chain-alkyl (meth)acrylate compounds are available on the market and can be used as such in the inventive method as the $G^2$-monomer.

The copolymeric graft polymer obtained by the copolymerization including the long chain-alky (meth)acrylate as a comonomer further comprises, in addition to the monomeric units of the formulas (Ia) and (IIa), the repeating monomeric units of the formula $$-(-CH_2-CR^1G^2-)-, \qquad (IIIa)$$

in which $R^1$ has the same meaning as defined above and $G^2$ is a long chain alkyl-containing grafting unit expressed by the formula $$-CO-O-R^4, \qquad (IIIb)$$

in which $R^4$ has the same meaning as defined above.

The radical-polymerizable terminal group in the $G^2$-monomer of course can be, besides the above described (meth)acrylic group, an alkenyl group such as vinyl and allyl groups.

When further introduction of polyoxyalkylene residues into the graft copolymer as the grafting units on the backbone chain structure is desired, the copolymerization reaction of the (meth)acryloxyalkyl-terminated diorganopolysiloxane compound of the general formula (I), optionally, in combination with the (meth)acrylic monomer of the general formula (11) is conducted with a polymerization mixture further containing a polyoxyalkylene (meth)acrylate ester having a polyoxyalkylene residue in the molecule, referred to as the $G^3$-monomer herein-after, represented by the general formula $$CH_2=CR^1-CO-O-(-C_aH_{2a}-O-)_b-R^5, \qquad (IV)$$

In which $R^1$ has the same meaning as defined above, $R^5$ is a hydrogen atom, monovalent hydrocarbon group having 1 to 4 carbon atoms or acetyl group, the subscript a is, each independently from the others, 2 or 3 and the subscript b is a positive number in the range from 2 to 50 on an average.

Several commercial products of the polyoxyalkylene (meth)acrylate ester compounds of the general formula (IV) are available on the market and can be used as such as the $G^3$-monomer in the method of the present invention including polyoxyethylene (meth)acrylate, polyoxypropylene (meth)acrylate and random- or block-copolymeric (polyoxyethylene-polyoxypropylene) (meth)acrylate.

The copolymeric graft polymer obtained by the copolymerization including the polyoxyalkylene residue-containing (meth)acrylic monomer of the general formula (IV) as one of the comonomers further comprises the repeating monomeric units of the formula

$$—(—CH_2—CR^1G^3—)—, \tag{IVa}$$

in which $R^1$ has the same meaning as defined above and $G^3$ is a polyoxyalkylene residue-containing grafting unit expressed by the formula

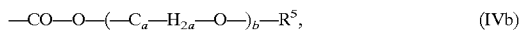
$$—CO—O—(—C_a—H_{2a}—O—)_b—R^5, \tag{IVb}$$

in which each symbol has the same meaning as defined above.

The radical-polymerizable terminal group in the $G^3$-monomer can be, besides the above described (meth) acryloxy group, an alkenyl group such as vinyl and allyl groups.

Introduction of the above described long-chain alkyl-containing grafting units of the formula (IIIb) and/or the polyoxyalkylene residue-containing grafting units of the formula (IVb) into the graft copolymer is accomplished by the copolymerization of a comonomer mixture including the comonomer (a) of the general formula (II) and the (meth) acryloxyalkyl-terminated diorganopolysiloxane compound of the general formula (I) with further admixture of the comonomer of the general formula (III) and/or the comonomer of the general formula (IV).

The copolymerization ratio in the copolymerization of these three or four comonomers, i.e. the molar mixing ratio thereof in the polymerization mixture, should be selected naturally depending on the properties desired for the resultant graft copolymer. When the graft copolymer contains all of the three types of the grafting units, the amounts of the $G^1$-, $G^2$- and $G^3$-monomers in the polymerization mixture should be in the ranges, for example, from 5 to 60% by weight, from 2 to 50% by weight and from 2 to 50% by weight, respectively, or, preferably, from 10 to 50% by weight, from 5 to 30% by weight and from 5 to 30% by weight, respectively, the balance to 100%, if any, being the comonomer (a).

When the mixing proportion of the $G^1$-monomer is too small, the resultant graft copolymer cannot be imparted with fully improved weatherabillity, water-repellency, anti-stain insusceptibility, mold-releasability or surface releasability and lubricity while, when the proportion thereof is too large, difficulties are encountered in the preparation of a film from the graft copolymer. When the mixing proportion of the $G^2$-monomer is too small, the graft copolymer cannot be imparted with high mold-releasability or surface-releasability. When the intended application of the graft copolymer is as a waxy material, the proportion of the $G^2$-monomer should be increased in consideration of the desired melting point of the waxy material. When the mixing proportion of the $G^3$-monomer is too small, the graft copolymer cannot be highly hydrophilic on the surface to be inferior in the antistatic behavior while, when the proportion thereof is too large, the graft copolymer suffers a decrease in the water-repellency, surface-releasability and lubricity.

The type of the polymerization procedure for the copolymerization of the above described comonomers including the comonomer (a) and the $G^1$- to $G^3$-monomers in the presence of a radical-polymerization initiator is not particularly limitative and can be any of bulk polymerization, solution polymerization, emulsion polymerization and suspension polymerization although it is convenient and efficient to undertake a procedure of solution polymerization by dissolving the comonomers in a suitable organic solvent together with a radical-polymerization initiator and heating the solution at an elevated temperature with agitation to give a copolymer solution containing the graft copolymer, from which the graft copolymer is isolated by removing the organic solvent. Solution polymerization is preferable because the average molecular weight of the copolymer can be readily controlled in this method as compared with the other methods. It is also preferable that the solution polymerization is conducted in an organic solvent which also can dissolve the graft copolymer.

A variety of organic compounds are known as a radical-polymerization initiator including organic peroxide compounds such as dibenzoyl peroxide, dicumyl peroxide and tert-butylperoxy 2-ethylhexyl hexanoate and azo compounds such as azobisisobutyronitrile and the like. The amount of the radical-polymerization initiator in the polymerization mixture can be conventional and should be selected in the range from 0.01% to 5% by weight based on the total amount of the comonomers depending on the desired velocity of the polymerization reaction, average degree of polymerization of the copolymer and types of the initiator compound.

A variety of organic solvents can be used as the solvent for the solution polymerization of the comonomer mixture including alcoholic solvents such as isopropyl alcohol and butyl alcohol, aromatic hydrocarbon solvents such as benzene, toluene and xylene, ketone solvents such as methyl ethyl ketone and methyl isobutyl ketone, and ester solvents such as ethyl acetate and isobutyl acetate. These organic solvents can be used either singly or as a mixture of two kinds or more according to need. The concentration of the comonomers in the polymerization mixture is selected in the range from 10% to 70% by weight.

The copolymerization reaction in the above mentioned solution polymerization is carried out at a temperature in the range from 50 to 180° C. or, preferably, from 60 to 120° C. under an atmosphere of nitrogen gas although it is convenient to conduct the reaction at a temperature lower than the boiling point of the organic solvent or the polymerization mixture. When conducted under these conditions, the polymerization reaction is completed usually within 5 to 10 hours to give the copolymeric graft polymer in a good yield in the form of a solution in the organic solvent assuming that the organic solvent used can dissolve also the graft copolymer.

It is almost always unavoidable even after completion of the copolymerization reaction as mentioned above that small or trace amounts of the respective comonomers remain unpolymerized and contained in the copolymer solution to cause various disadvantages and troubles mentioned before. The unexpected discovery by the inventors leading to completion of the present invention is that the above mentioned disadvantages and troubles can be overcome by subjecting the copolymer solution to a hydrogenation treatment so as to convert any aliphatically unsaturated matter into a saturated material.

The hydrogenation reaction of the copolymer solution is performed either under pressurization with hydrogen gas in the presence of a hydrogenation catalyst or by the addition of a metal hydride as a hydrogenating agent although these two methods can be employed in combination. The method of inhomogeneous catalytic hydrogenation by the use of a solid hydrogenation catalyst is the most preferred because the reaction mixture after the hydrogenation reaction can readily be freed from the catalyst used in the reaction. The solid hydrogenation catalyst is not particularly limitative and can be selected from those conventionally used in the hydrogenation reaction of organic compounds including those based on nickel, palladium, platinum, rhodium, cobalt, chromium, copper, iron and the like as the catalytically active ingredient either in the elementary form or in the form of a compound. The solid catalyst can be either unsupported or supported on a solid catalyst carrier such as active carbon, silica gel, silica-alumina gel, alumina gel, zeolite and the like. It is optional that two kinds or more of different hydrogenation catalysts are used in combination.

The inhomogeneous catalytic hydrogenation reaction is carried out usually by pressurization with hydrogen gas under a pressure of 1 to 100 kg/cm$^2$(absolute) at a temperature in the range from 50 to 200° C. either in a batch process or in a continuous process. The reaction time taken for completion of the hydrogenation reaction is usually in the range from 3 to 12 hours when the reaction is undertaken as a batch process though widely dependent on the reaction temperature, pressure of hydrogen gas, amount of the catalyst and other factors. The end point of the hydrogenation reaction can readily be detected by carefully monitoring the pressure indicated on a pressure gauge which ceases to further drop when the reaction has reached near to completion. The hydrogen pressure should be maintained within the above mentioned range during proceeding of the reaction. After completion of the hydrogenation reaction, the reaction mixture is filtered to remove the solid catalyst and the thus obtained copolymer solution is, if necessary, subjected to stripping of the solvent to isolate the desired organopolysiloxane-grafted copolymer free from any aliphatic unsaturation. Alternatively, the graft copolymer can be isolated from the solution by the conventional precipitation method by the addition of a solvent incapable of dissolving the graft copolymer.

When the organopolysiloxane-grafted copolymer is used in the form of a solution for the intended application, the solution either can be the copolymer solution obtained by the hydrogenation reaction after removal of the solid catalyst or can be prepared by dissolving the isolated graft copolymer in a fresh organic solvent. Organic solvents suitable for this purpose include alcohols such as isopropyl alcohol and butyl alcohol, aromatic hydroocarbon solvents such as benzene, toluene and xylene, aliphatic hydrocarbon solvents such as n-hexane, n-octane and n-decane, ketones such as methyl ethyl ketone, methyl isobutyl ketone and cyclohexanone, esters such as ethyl acetate and butyl acetate, cyclic ethers such as dioxane and tetrahydrofuran and amide solvents such as dimethylformaide and dimethylacetamide. Further, oligomeric organosiloxane compounds such as hexamethyl disiloxane, octamethyl trisiloxane, dodecamethyl pentasiloxane, hexamethyl cyclotrisiloxane and octamethyl cycloterasiloxane can also be used as the solvent for the organopolysiloxane-grafted copolymer. These solvents can be used either singly or as a mixture of two kinds or more according to need, if compatible.

Depending on the intended application, the organopolysiloxane-grafted copolymer either as such or in the form of a solution can be admixed according to need with a variety of known additives including crosslinking agents, other conventional resins, fillers, stabilizers, viscosity-controlling agents, film-formation aids and others having compatibility with the graft copolymer.

In the following, the present invention is illustrated in more detail by way of Examples and Comparative Examples, in which the term of "parts" always refers to "parts by weight".

EXAMPLE 1

A polymerization mixture was prepared in a reaction vessel of glass by dissolving, in 1000 parts of toluene, 551 parts of a 3-methacryloxypropyl-terminated dimethylpolysiloxane expressed by the structural formula

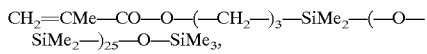

In which Me is a methyl group, 395 parts of stearyl methacrylate (NK Ester S, a product by Shin-Nakamura Kagaku Co.), 54 parts of methyl methacrylate and 20 parts of tert-butylperoxy-2-ethylhexyl hexanoate (Perbutyl O, a product by Nippon Oil & Fat Co.) and the polymerization mixture was heated with agitation at a temperature of 90 to 100° C. for 10 hours under an atmosphere of nitrogen gas to give a viscous polymer solution containing 50% by weight of a non-volatile matter.

In the next place, 2000 parts of the above obtained polymer solution were transferred into a stainless steel autoclave and admixed with 2 parts of a powdery catalyst containing 10% by weight of palladium supported on an active carbon carrier to form a reaction mixture for hydrogenation, which was heated for 6 hours at a temperature of 120° C. under a hydrogen pressure of 5 kg/cm$^2$ (absolute) to effect the hydrogenation reaction. After completion of the hydrogenation reaction, the polymer solution taken out of the autoclave was filtered to remove the solid catalyst and subjected to stripping of the solvent, i.e. toluene, at a temperature of 50° C. under a reduced pressure of 5 mmHg to give a light yellow solid resin as the product which had a melting point of 28–30° C.

The results of the infrared absorption spectrophotometric analysis and $^1$H-NMR spectrometric analysis undertaken for this resinous product supported the conclusion that the resin was a graft copolymer having dimethylpolysiloxane residues and long-chain alkyl, i.e. stearyl, groups as the grafting units on the carbon-carbon backbone chain structure. The graft copolymer had a weight-average molecular weight of about 57000 as determined by the gel permeation chromatographic method making reference to polystyrene specimens.

The content of aliphatic unsaturation due to remaining methacrylic groups CH$_2$=CMe— in the graft copolymer was estimated by calculation from the $^1$H-signal (6.1 ppm) in the $^1$H-NMR spectrum assignable to the hydrogen atom on the terminal carbon atom with a double bond. The result was that absolutely no aliphatic unsturation could be detected in the graft copolymer.

Further, a 50 g portion of the solid graft copolymer was taken in a glass bottle of 100 ml capacity and kept therein under hermetic sealing at 60° C. for 24 hours followed by removal of the stopper and an organoleptic smelling test to detect emission of irritative odour from the graft copolymer by panel members. The result was that nobody of the panel members reported detection of even a trace of any irritative odour.

EXAMPLE 2

A polymerization mixture was prepared in a reaction vessel of glass by dissolving, in 1500 parts of toluene, 1017 parts of a 3-methacryloxypropyl-terminated dimethylpolysiloxane expressed by the structural formula

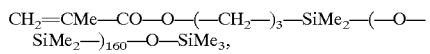

210 parts of methacryloxy-terminated polyoxypropylene (Blenmer P1000, a product by Nippon Oil & Fat Co.) expressed by the structural formula

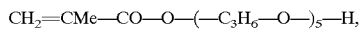

210 parts of stearyl methacrylate (NK Ester S, supra), 63 parts of methyl methacrylate and 10 parts of tert-butylperoxy-2-ethylhexyl hexanoate (Perbutyl O, supra) and the mixture was heated with agitation at a temperature of 90 to 100° C. for 10 hours under an atmosphere of nitrogen gas to give a viscous polymer solution containing 50% by weight of a non-volatile matter.

In the next place, 3000 parts of the above obtained polymer solution were transferred into a stainless steel autoclave and admixed with 2 parts of the same palladium catalyst as used in Example 1 to form a reaction mixture for hydrogenation, which was heated for 6 hours at a temperature of 50° C. under a hydrogen pressure of 5 kg/cm² (absolute) to effect the hydrogenation reaction. After completion of the hydrogenation reaction, the polymer solution taken out of the autoclave was filtered to remove the solid catalyst and subjected to stripping of the solvent, i.e. toluene, at a temperature of 120° C. under a reduced pressure of 5 mmHg to give a colorless and transparent resin of gel-like consistency as the product which had a weight-average molecular weight of about 24000.

The results of the infrared absorption spectrophotometric analysis and $^1$H-NMR spectrometric analysis undertaken for this product resin supported the conclusion that the resin was a graft copolymer having three types of grafting units including the dimethylpolysiloxane residues, long-chain alkyl groups and polyoxypropylene residues bonded on the carbon-carbon backbone chain structure. The result of the estimation test for the content of aliphatic unsaturation was that absolutely no unsaturation could be detected. Nobody of the panel members in the organoleptic smelling test reported that emission of any irritative odour from the resin product could be detected.

EXAMPLE 3

A polymerization mixture was prepared in a reaction vessel of glass by dissolving, in 975 parts of toluene, 334 parts of the same 3-methacryloxypropyl-terminated dimethylpolysiloxane as used in Example 1,283 parts of behenyl methacrylate (Blenmer VMA, a product by Nippon Oil & Fat Co.), 33 parts of methyl methacrylate and 16 parts of tert-butylperoxy-2-ethylhexyl hexanoate (Perbutyl O, supra) and the mixture was heated with agitation at a temperature of 90 to 100° C. for 10 hours under an atmosphere of nitrogen gas to give a viscous polymer solution containing 40% by weight of a non-volatile matter.

In the next place, the above obtained polymer solution was transferred into a stainless steel autoclave and admixed with 1 part of the same palladium catalyst as used in Example 1 to form a reaction mixture for hydrogenation, which was heated for 6 hours at a temperature of 50° C. under a hydrogen pressure of 5 kg/cm²(absolute) to effect the hydrogenation reaction. After completion of the hydrogenation reaction, the polymer solution taken out of the autoclave was filtered to remove the solid catalyst and subjected to stripping of the solvent, i.e. toluene, at a temperature of 120° C. under a reduced pressure of 5 mmHg to give a colorless solid resin having a melting point of 48–51° C. as the product which had a weight-average molecular weight of about 44000 according to the gel permeation chromatographic method.

The results of the infrared absorption spectrophotometric analysis and $^1$H-NMR spectrometric analysis undertaken for this product resin supported the conclusion that the resin was a graft copolymer having two types of grafting units including the dimethylpolysiloxane residues and long-chain alkyl groups bonded onto the carbon-carbon backbone chain structure. The result of the estimation test for the content of aliphatic unsaturation was that absolutely no unsaturation could be detected. Nobody of the panel members in the organoleptic smelling test reported that emission of any irritative odour from the resin product could be detected.

COMPARATIVE EXAMPLES 1 to 3

The experimental procedure in each of these Comparative Examples was substantially the same as in Examples 1, 2 and 3, respectively, except that the hydrogenation treatment of the polymer solution obtained by the copolymerization reaction was omitted and the polymer solution was directly subjected to stripping of the solvent. The results of the estimation tests for residual content of aliphatic unsaturation were 0.12 meq./g, 0.29 meq./g and 0.09 meq./g, respectively. The results of the organoleptic smelling tests for an irritative odour were that all of the panel members reported detection of an irritative odour from each of the resin products.

What is claimed is:

1. A method for the preparation of a graft copolymer having a carbon-carbon backbone chain structure and having grafting units comprising organopolysiloxane residues each bonded to a carbon atom of the carbon-carbon backbone chain structure which comprises the steps of:

(1) dissolving, in an organic solvent, (a) a radical-polymerizable ethylenically unsaturated organic monomeric compound, (b) a grafting unit-introducing radical-polymerizable monomeric compound comprising (b1) an organopolysiloxane compound terminated at a single molecular chain end of the molecule by a radical-polymerizable group and (c) a radical-polymerization initiator to form a polymerization mixture;

(2) heating the polymerization mixture at an elevated temperature to form a polymer solution by the copolymerization reaction of the organic monomeric compound (a) and the organopolysiloxane compound having a radical-polymerizable terminal group (b1) in the presence of the radical-polymerization initiator (c);

(3) subjecting the polymer solution to a hydrogenation reaction under pressurization with hydrogen gas in the presence of a hydrogenation catalyst; and (4) removing the hydrogenation catalyst from the polymer solution to give an organopolysiloxane-grafted copolymer free from aliphatic unsaturation.

2. A method for the preparation of an acrylic graft copolymer having grafting units comprising organopolysiloxane residues which comprises the steps of:

(1) dissolving, in an organic solvent, (a) a (meth)acrylic monomeric compound represented by the general formula

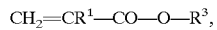

in which $R^1$ is a hydrogen atom or a methyl group and $R^3$ is an alkyl group having 1 to 4 carbon atoms, (b) a grafting unit-introducing radical-polymerizable monomeric compound comprising (b1) a diorganopolysiloxane compound terminated at a single molecular chain end of the molecule by a (meth)acryloxyalkyl group represented by the general formula $$CH_2=CR^1-CO-O-R^2-SiR_m[-(-O-SiR_2-)_n-O-SiR_3]_{3-m}$$

in which each R is, each independently from the others, an unsubstituted or halogen-substituted monovalent hydrocarbon group having 1 to 18 carbon atoms, $R^1$ is a hydrogen atom or a methyl group, $R^2$ is a divalent hydrocarbon group having 1 to 11 carbon atoms, the subscript m is 0, 1 or 2 and the subscript n is 0 or a positive number not exceeding 200 on average, and (c) a radical-polymerization initiator to form a polymerization mixture;

(2) heating the polymerization mixture at an elevated temperature to form a polymer solution by the copolymerization reaction of the organic monomeric compound (a) and the (meth)acryloxyalkyl-terminated organopolysiloxane compound (b1) in the presence of the radical-polymerization initiator (c);

(3) subjecting the polymer solution to a hydrogenation reaction under pressurization with hydrogen gas in the presence of a hydrogenation catalyst; and (4) removing the hydrogenation catalyst from the polymer solution to give an organopolysiloxane-grafted copolymer free from aliphatic unsaturation.

3. The method for the preparation of an acrylic graft copolymer having grafting units comprising organopolysiloxane residues as claimed in claim 2, in which R is a methyl group.

4. The method for the preparation of an acrylic graft copolymer having grafting units comprising organopolysiloxane residues as claimed in claim 2, in which the subscript m is 2.

5. The method for the preparation of an acrylic graft copolymer having grafting units comprising organopolysiloxane residues as claimed in claim 2 in which the grafting unit-introducing radical-polymerizable monomeric compound further comprises a monomeric compound selected from the group consisting of (b2) long chain-alkyl (meth) acrylates represented by the general formula $$CH_2=CR^1-CO-O-R^4,$$

in which $R^1$ is a hydrogen atom or a methyl group and $R^4$ is an alkyl group having 5 to 50 carbon atoms, and (b3) (meth)acryloxy-terminated polyoxyalkylene compounds represented by the general formula $$CH_2=CR^1-CO-O-(-C_aH_{2a}-O-)_b-R^5,$$

in which $R^1$ is a hydrogen atom or a methyl group, $R^5$ is a hydrogen atom, a monovalent hydrocarbon group having 1 to 4 carbon atoms or an acetyl group, the subscript a is 2 or 3 and the subscript b is a positive number in the range from 2 to 50 on an average.

6. The method for the preparation of an acrylic graft copolymer having grafting units comprising organopolysiloxane residues as claimed in claim 5 in which the alkyl group denoted by $R^4$ is selected from the group consisting of palmityl group, stearyl group and behenyl group.

7. The method for the preparation of an acrylic graft copolymer having grafting units comprising organopolysiloxane residues as claimed in claim 5 in which the am ounts of the monomeric compounds (b1), (b2) and (b3) are in the ranges from 5 to 60% by weight, from 2 to 50% by weight and from 2 to 50% by weight, respectively, based on the total amount of the monomeric compounds (a), (b1), (b2) and (b3), the balance to 100%, if any, being the monomeric compound (a).

8. The method for the preparation of an acrylic graft copolymer having grafting units comprising organopolysiloxane residues as claimed in claim 2 in which the hydrogenation reaction in step (3) is carried out under a hydrogen pressure in the range from 1 to 100 $kg/cm^2$ (absolute) at a temperature in the range from 50 to 200° C.

9. The method of claim 2, wherein, in the (meth) acryloxyalkyl group, n is a positive number and the $SiR_2$ group is a dimethylsiloxane, dialkyl siloxane where the alkyl groups are of 2 to 18 carbon atoms, methylphenylsiloxane, diphenylsiloxane or methyl (3,3,3-trifluoropropyl) siloxane unit.

10. The method of claim 2, wherein, in the (meth) acryloxyalkyl group, n is a positive number and the $SiR_2$ group is a dimethylsiloxane unit.

11. The method of claim 1, wherein the radial-polymerizable ethylenically unsaturated organic monomer compound, (a), is a (meth)acrylic acid, alkyl (meth)acrylate, an acid amide compound, an amino-substituted (meth) acrylic compound, an epoxy-containing (meth)acrylic compound, styrene, an unsaturated dicarboxylic acid or salt thereof, a radical-polymerizable organosilane compound, (meth)acrylonitrile, vinyl pyrrolidone, a vinyl carboxylate, a vinyl alkyl ether, a polystyrene, a polycaprolactone or any mixture thereof.

12. The method of claim 7, wherein the amounts of the (b1), (b2) and (b3) monomeric compounds is 10 to 50%, 5 to 30% and 5 to 30%, respectively.

13. The method of claim 1, wherein the polymerization step (2) is by bulk polymerization, solution polymerization, emulsion polymerization or suspension polymerization.

14. The method of claim 1, wherein the polymerization step (2) is by solution polymerization in a solvent which will dissolve the graft copolymer.

15. The method of claim 14, wherein the solution polymerization is carried out a temperature in the range from 50 to 180° C.

16. The method of claim 1, wherein the hydrogenation catalyst in the hydrogenation reaction, step (3), is a solid hydrogenation catalyst with a catalytically active amount of nickel, palladium, platinum, rhodium, cobalt, chromium, copper, iron or mixtures thereof and is either unsupported or supported on an active carbon, silica gel, silica-alumina gel, alumina gel or zeolite carrier.

* * * * *